United States Patent [19]

Jaffrennou et al.

[11] 4,319,858
[45] Mar. 16, 1982

[54] HIGH RESISTANCE FLEXIBLE BOOM

[75] Inventors: Bernard Jaffrennou, Echirolles; Maurice Cessou, Communay, both of France

[73] Assignees: Societe Anonyme ROLBA, Fontaine; Institut Francais du Petrole, Rueil-Malmaison, both of France

[21] Appl. No.: 85,365

[22] Filed: Oct. 16, 1979

[30] Foreign Application Priority Data

Oct. 16, 1978 [FR] France .............................. 78 29417
Dec. 1, 1978 [FR] France .............................. 78 33932
Jul. 6, 1979 [FR] France .............................. 79 17640

[51] Int. Cl.³ .......................................... E02B 15/04
[52] U.S. Cl. ...................................... 405/68; 405/66
[58] Field of Search ................................. 405/63-72; 210/922, 923

[56] References Cited

U.S. PATENT DOCUMENTS

| | | | |
|---|---|---|---|
| 3,667,235 | 6/1972 | Preus et al. | 405/63 |
| 3,702,657 | 11/1972 | Cunningham et al. | 405/71 X |
| 3,775,982 | 4/1973 | Lamboley | 405/72 |
| 3,783,622 | 1/1974 | Gambel | 405/64 |
| 3,800,542 | 4/1974 | Cerasari | 405/72 |
| 3,802,201 | 4/1974 | Hoult et al. | 405/68 |
| 3,922,862 | 12/1975 | Vidilles | 405/68 X |
| 3,924,412 | 12/1975 | Bennett et al. | 405/66 X |
| 3,973,406 | 8/1976 | Casey | 405/66 |

FOREIGN PATENT DOCUMENTS 7103594 9/1971 Netherlands .......................... 405/63

Primary Examiner—Dennis L. Taylor
Attorney, Agent, or Firm—Millen & White

[57] ABSTRACT

A floating boom unit having a flexible structure which comprises a water transparent armouring is supported by floats in a substantially vertical position. The armouring includes longitudinal and transverse elements. The longitudinal elements are adapted to withstand substantially the whole of the longitudinal traction loads to which the boom is subjected in service, and a balanced distribution of these longitudinal loads between the different longitudinal elements is assured by resistant transverse elements connected to the longitudinal elements as to maintain a substantially uniform spacing between adjacent longitudinal elements, said armouring being further provided with transverse stiffeners adapted to support the floats.

19 Claims, 21 Drawing Figures

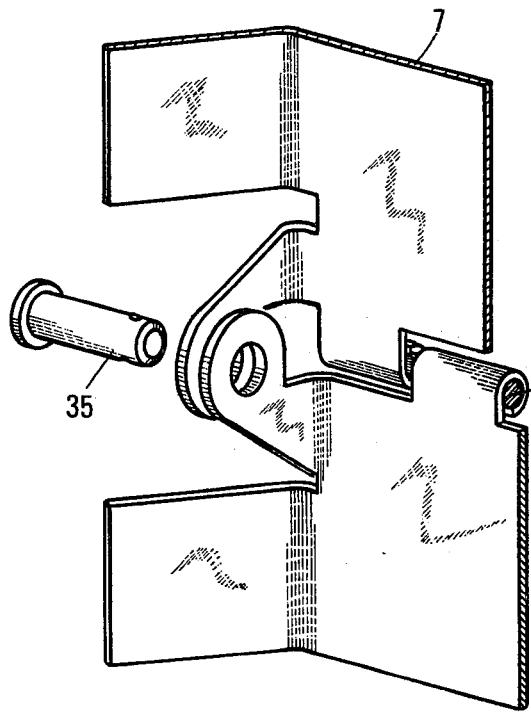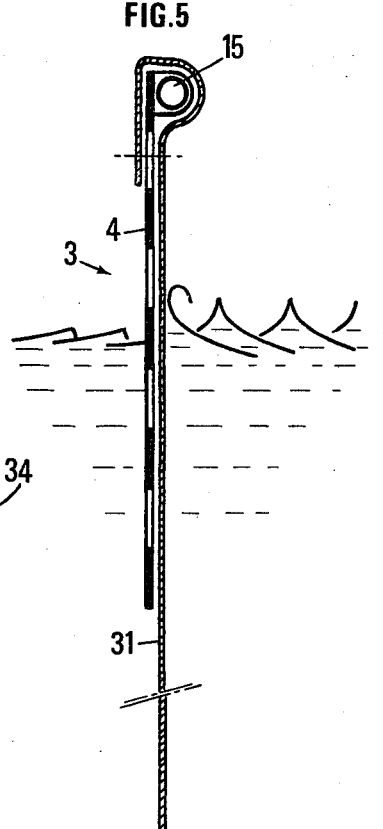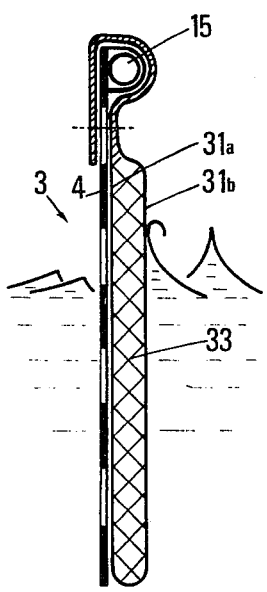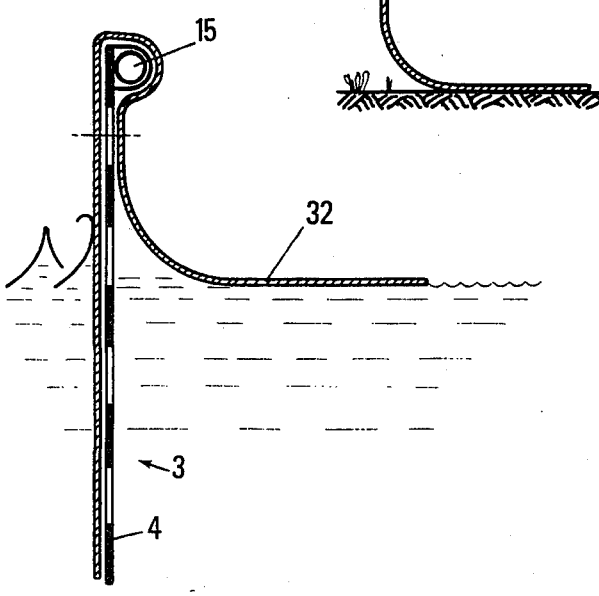

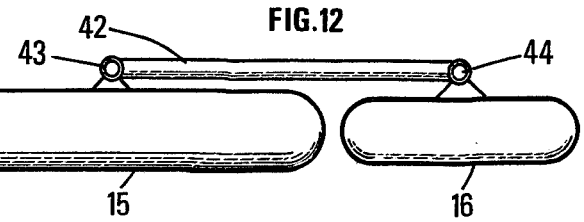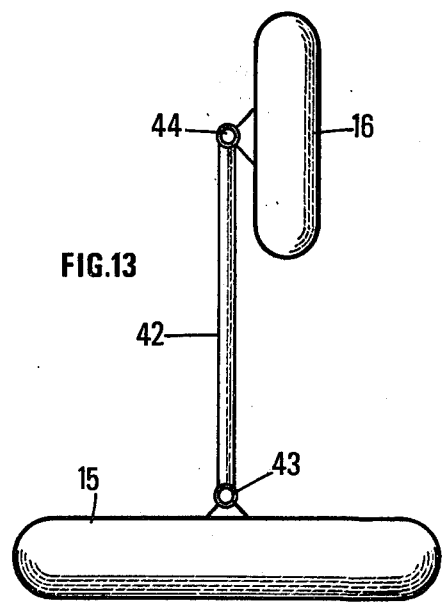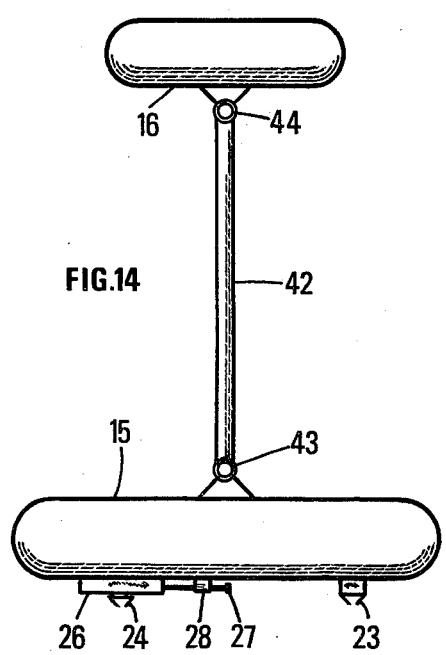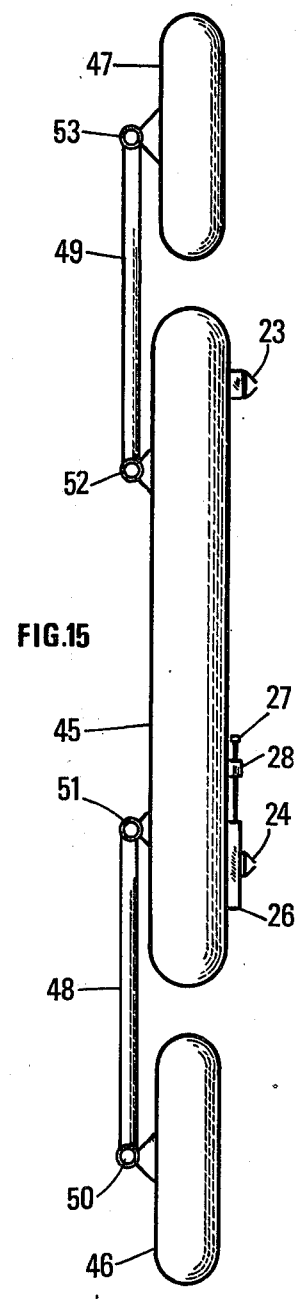

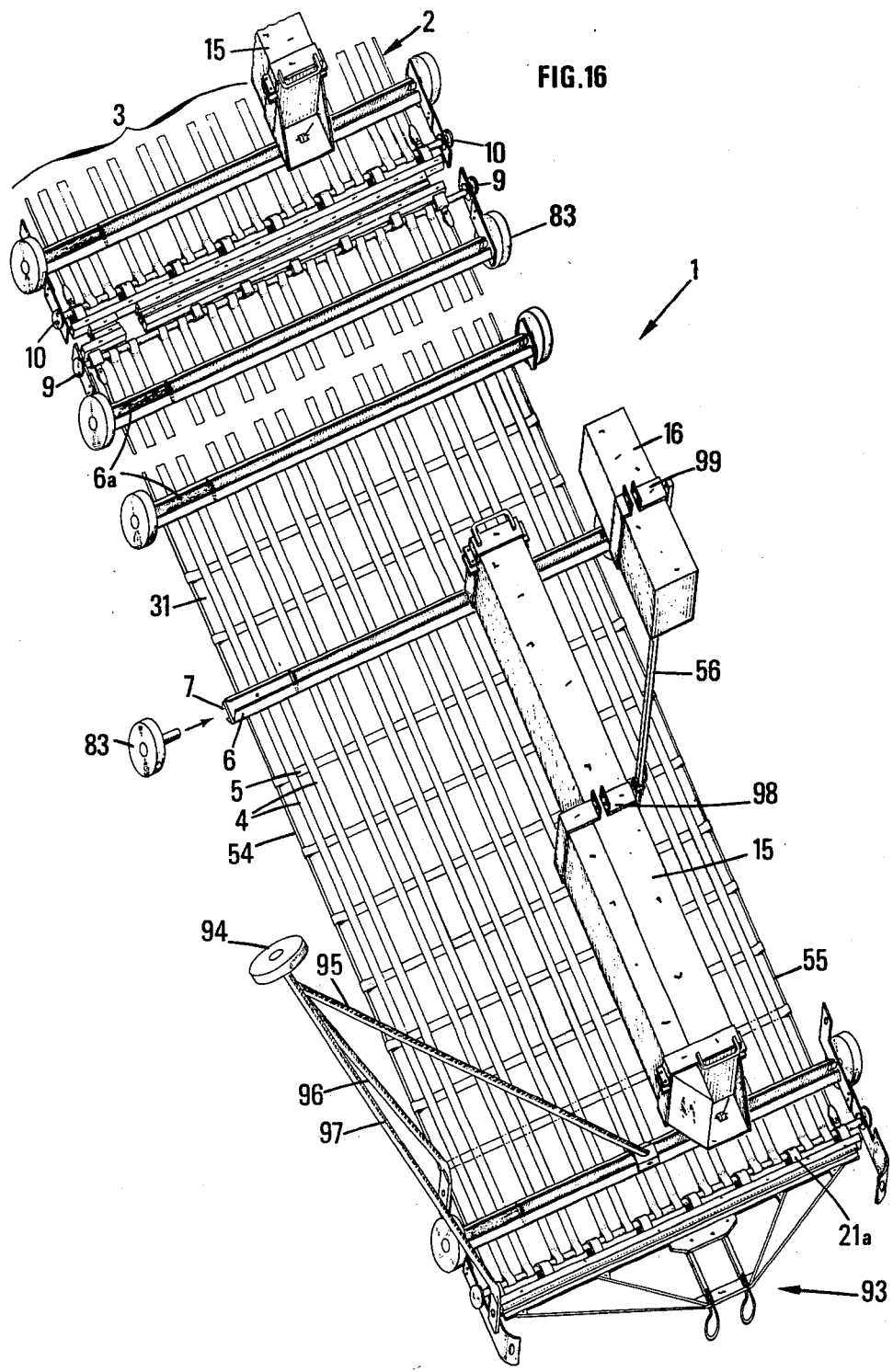

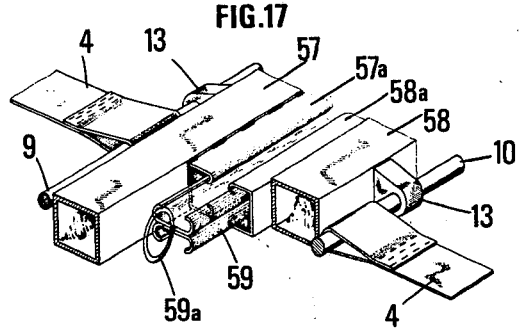
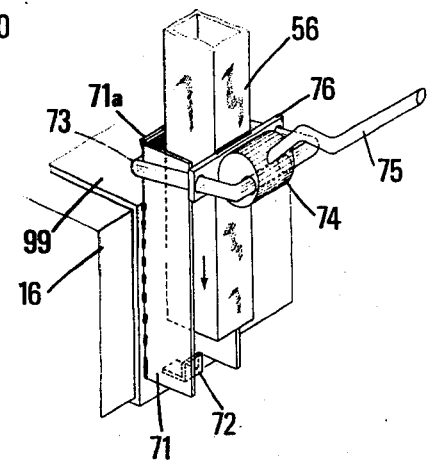
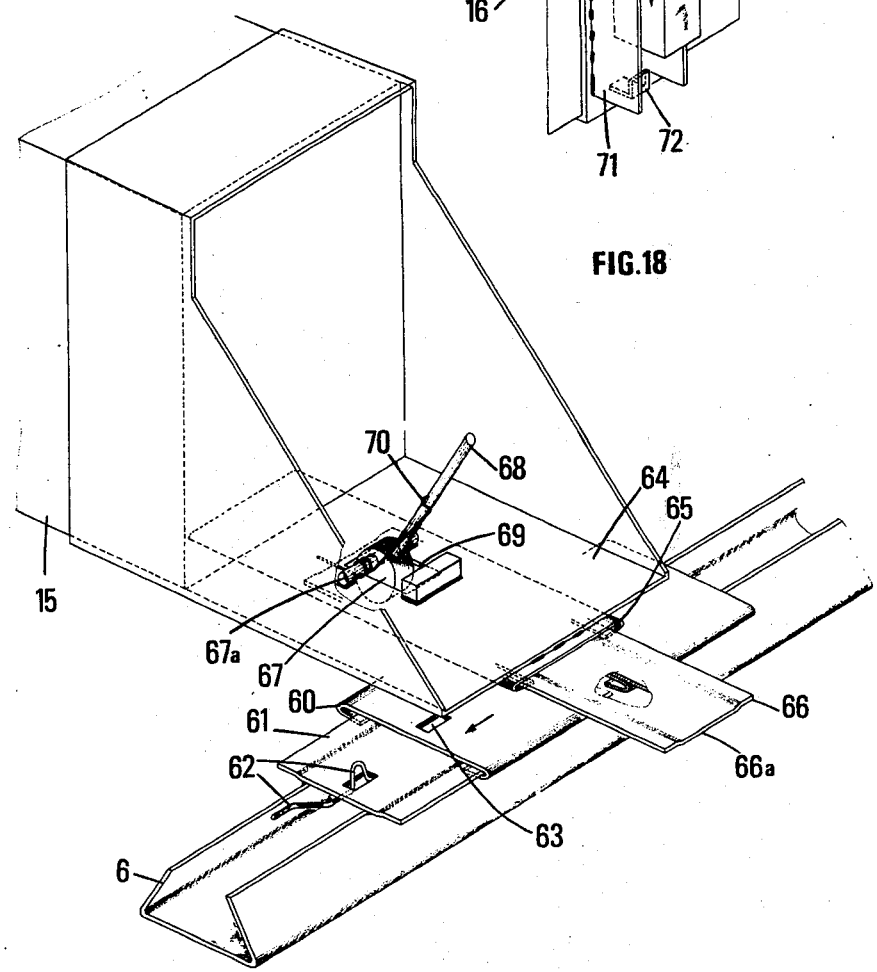

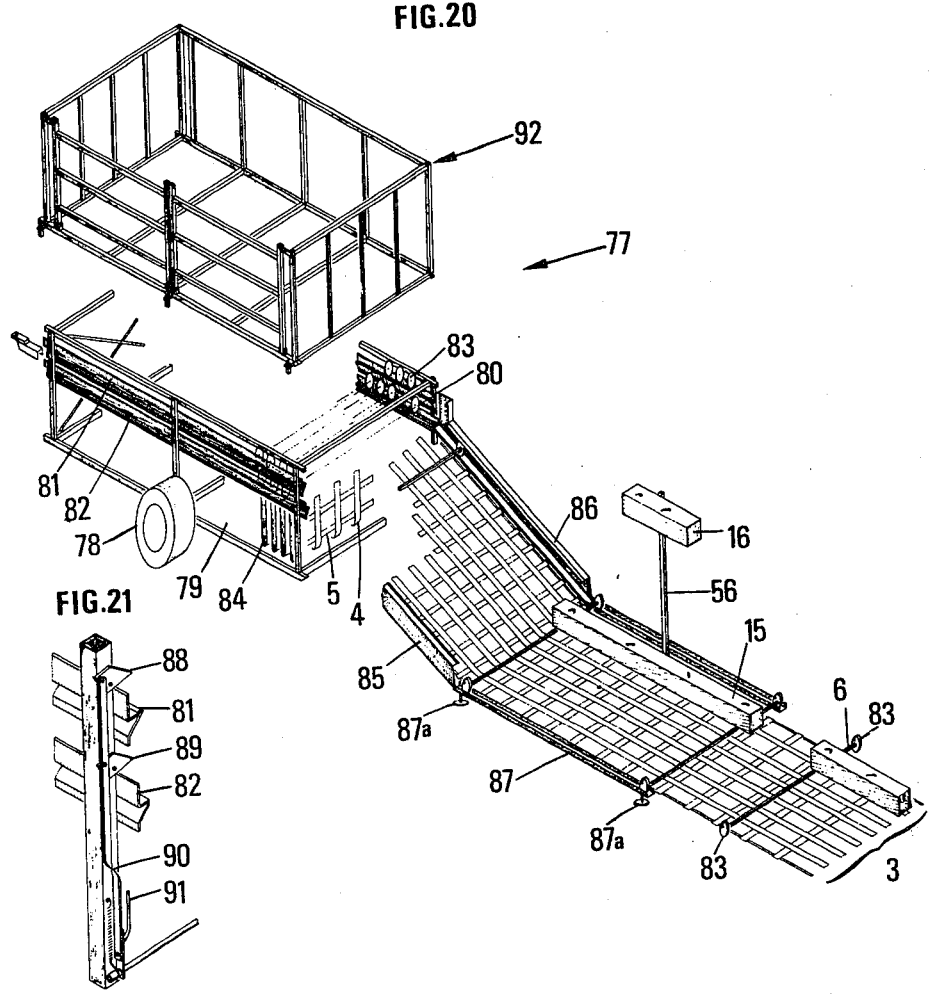

HIGH RESISTANCE FLEXIBLE BOOM

BACKGROUND OF THE INVENTION

The present invention relates to a high resistance flexible floating boom.

This boom is in particular suitable for defining shipping zones or water areas, either on the water surface, or throughout the whole water depth (for moderate water depths which may reach 20 meters, for example).

Such water areas may be for example, used as swimming areas, or for other aquatic activities, or also for "aquaculture".

A very important application of the invention is for fighting against water pollution caused by floating solid wastes or by water soluble or immiscible chemical products, more particularly hydrocarbons.

Most of the booms presently used are constituted by horizontal floats supporting a watertight skirt provided with ballast weights for holding such skirts down.

A main disadvantage of this type of boom is that they cannot practically prevent the passage of hydrocarbons spread on the water surface as a result of their limited height above the water level. Moreover, their watertight skirt cannot prevent passage of the hydrocarbons under the boom caused by a vortex effect when the speed of the water current exceeds 1 or 2 knots.

Another type of prior art floating boom is also known which comprises a structure supported by floats on both sides of the water level in an upright position and adapted to constitute a barrier.

However, such booms have points of reduced resistance and are likely to be rapidly destroyed in rough sea conditions.

It is known to use in such a boom structure, longitudinal cables adapted, in particular, to withstand traction loads as described in French Pat. No. 2,101,606, in the Publication "Offshore", volume 32 of June 5, 1972, pages 69 and 70, as well as in the German Published Patent Application OS No. 2,051,711.

However, in such prior art structures the traction loads are not uniformly distributed over the whole height of the boom structure and, as a result, the boom structure may consequently be subjected to deformations due to differences in the respective traction loads at the different levels of the boom. More particularly, such loads can be caused by the water currents, from swell and winds, etc. The boom could be turned upside down as a result of the action of these different stresses.

It is also known in a boom to associate traction resistant elements with floats, as described in U.S. Pat. No. 3,921,407 and French Pat. No. 2,226,852, but in such booms the floats are not isolated from the traction loads to which the boom structure is subjected, and this requires either building floats of very high mechanical resistance which are thus heavier, of higher cost and of reduced buoyancy, or alternatively, risking the rupture of a float, which would cause severe damages to the boom.

It is also known from U.S. Pat. No. 3,882,682 to secure the floats to rigid vertical support members to isolate these floats from traction loads, but the structure described in this patent does not provide for a substantially uniform distribution of these traction loads over a plurality of longitudinal elements specially adapted to withstand such traction loads. Therefore, the differences in the traction loads supported by the boom at different levels thereof may cause the boom to turn upside down.

The boom described in U.S. Pat. No. 3,924,412 comprises a skirt which is subjected directly to the traction loads applied to the boom. This requires selecting, for the construction of the boom, a highly resistant material which must be of sufficient thickness to withstand these traction loads.

This structure, is consequently heavier and more expensive than a structure having spaced traction resisting elements. Moreover the increased weight makes it more difficult to maintain the boom in a balanced operative position when it is subjected to the different loads generated by the wind, currents and swell.

SUMMARY OF THE INVENTION

The main object of the invention is to provide a high resistance flexible boom forming an effective barrier.

Another object of the invention is to provide a barrier which may be adapted to different requirements of the users.

These goals are achieved by using in a boom according to the invention interchangeable modular components, such as floats and skirts of different types which may be associated to a high resistance base structure.

The invention includes the important advantage of being at will applicable at will to stationary booms whose construction is relatively time-consuming but which are of high reliability, and to operational booms of lighter construction which can be put into operation very rapidly.

Another advantage of the invention is to permit the use of either vertical or horizontal floats, in accordance with the water depth and tide amplitude.

An additional advantage of the invention is to permit the use of various types of skirts according to different requirements (watertight, permeable, or hybrid, skirt, vertical skirt of reduced height or extending over the whole water depth, and/or an adsorbing cushion, optionally in combination with a horizontal skirt).

Non-limitative embodiments of the invention will be described below, with reference to the accompanying drawings wherein the same reference numerals are used to designate similar elements.

BRIEF DESCRIPTION OF THE DRAWINGS

FIG. 2 illustrates a hinged foldable stiffening element and means for locking this element in unfolded position, FIG. 5 shows an embodiment of the invention comprising a vertical skirt which extends down to the water bottom, FIG. 6 illustrates an embodiment of the invention comprising a vertical skirt which forms an envelope containing an adsorbing substance, FIG. 7 shows a boom according to the invention comprising a vertical skirt and a horizontal skirt, FIGS. 12 to 14 show the various different positions of a group of two floats connected by a hinged system, FIG. 15 represents, in folded or transport position, a group of three floats interconnected by a hinged system, FIG. 16 is a perspective view of a boom according to the invention which can be easily and rapidly put into operation, this boom being shown laying flat on the ground, FIG. 17 illustrates means for connecting two successive boom units, FIG. 18 illustrates means for securing the floats to stiffening elements and for stretching the armouring between two of these stiffening elements, FIG. 19 shows the connection of the floats by a connecting rod, FIG. 20 shows a container for the flexible boom and illustrates the loading and unloading operations thereof, and FIG. 21 is a detailed partial view of a section the container, showing means for holding the rollers.

DETAILED DISCUSSION OF THE INVENTION

Figure 1:
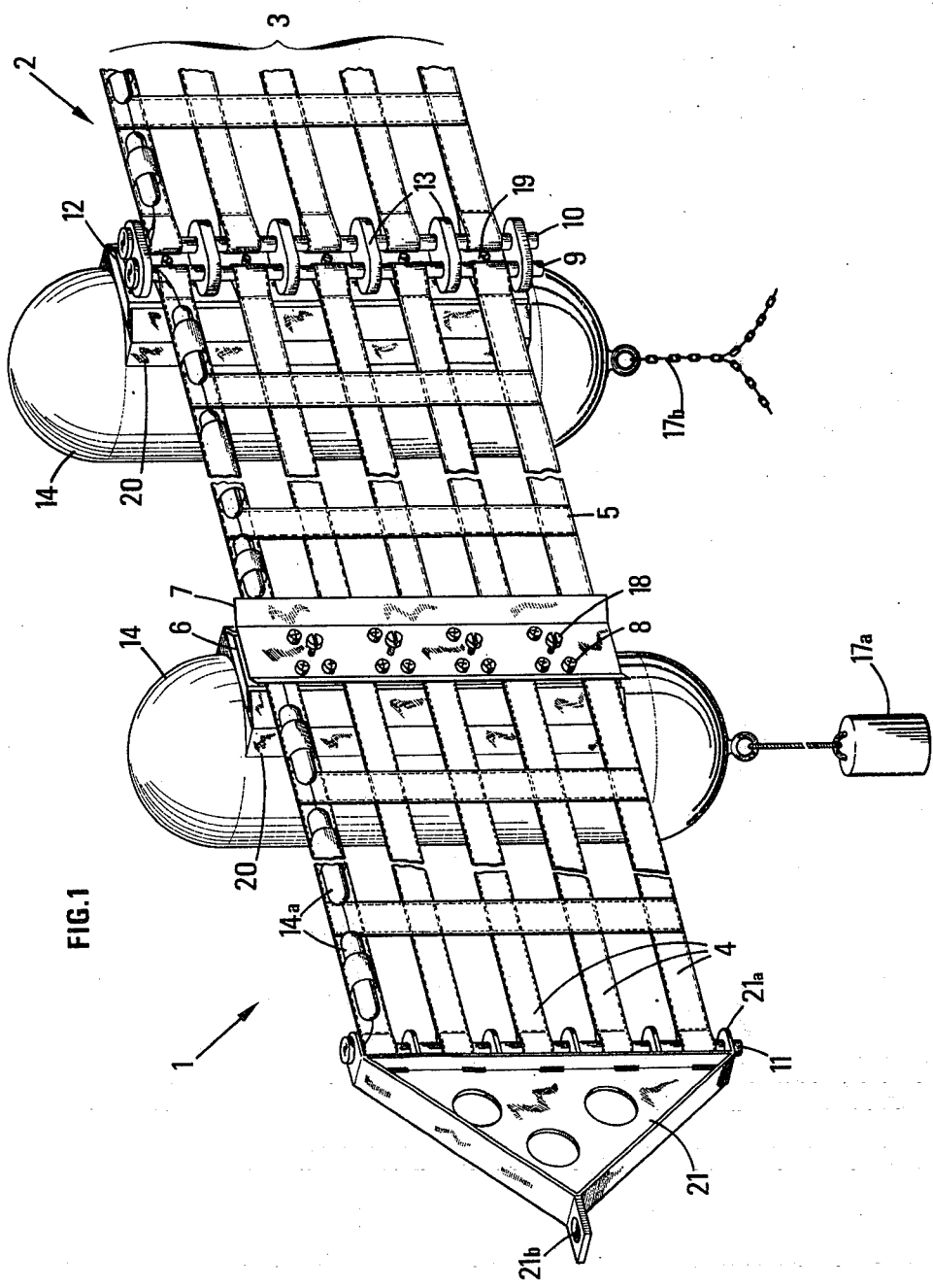
FIG. 1 is a perspective view of the armouring of a high resistance floating boom according to the invention.

FIG. 1 illustrates one embodiment of the invention with references 1 and 2 designate two interconnecting adjacent boom units. Each of these boom units has an armouring 3 comprising longitudinal elements 4 of a high resistance to traction, which may advantageously be formed by strips of reinforced material, and transverse resisting elements maintaining a predetermined spacing between the longitudinal elements 4, these transverse elements are for example, made up by strips 5 of the same nature as the longitudinal strips 4.

Strips 4 may, for example, be made of a core of plastic material reinforced by high resistance filaments, such as metal wires, glass fibers, carbon fibers, or fibers of plastic materials commonly used in the textile industry (polyamide, polyester, etc.).

The boom elements 1 and 2 also comprise stiffeners each of which is made up by profiled rigid members 6 and 7 located on both sides of the boom armouring which is pressed therebetween. The members 6 and 7 are interconnected by bolts or rivets 8, or by any other tightening means.

As illustrated in FIG. 1, the boom units 1 and 2 have fastening rods at their ends for ensuring a regular distribution of the traction loads over the longitudinal elements or strips 4 at the ends of each boom unit.

The ends of the different longitudinal strips 4 are secured to these fastening rods 9, 10, and 11.

The rods for connecting two consecutive boom units, such as the boom units 1 and 2 of FIG. 1, are interconnected by a coupling member which transmits longitudinal loads from one boom unit to the next one.

In the embodiment illustrated in FIG. 1, this coupling member is made up of a stiffening member 12 having flanges 13 traversed by the fastening rods 9 and 10.

The stiffening members 6 and 12 (the latter forming a part of a coupling element interconnecting the two successive boom units 1 and 2) are supported by weighted floats extending on both sides of the water level.

In the assembly illustrated in FIG. 1, the floats extend vertically and the stiffening elements are secured thereto in a manner as described below. A plurality of auxiliary horizontal floats 14a connected at the upper part of the armouring (which is above the water level during operation) are used to facilitate setting the boom upright in the water.

Ballast means which may be of different kinds (masses 17a, chain 17b, . . . etc) maintain the boom in upright position in water. Such means may either be connected to the floats (FIG. 1), or advantageously to the stiffening members.

As illustrated in FIG. 1, each float 14 is slidably mounted on a stiffening member 6.

These members having adjustable points for securing by means of bolts, such as 18 and 19, the vertical floats 14, permitting thereby adjustment of the buoyancy of the structure according to the requirements.

As a result of this mode of connection of the armouring 3 to the floats, the latter are not subjected to the traction loads applied to the boom, these loads being entirely supported by the armouring 3.

It will also be possible, without departing from the scope of the present invention, to place the floats 14 on both sides of the armouring 3, these floats being secured to the stiffening members 6 and 7.

The floats 14 may be rigid, or of the inflatable type equipped with a rigid reinforcement such as 20 (FIG. 1) slidably mounted along a stiffening member 6 having an adjustable connecting point.

As illustrated in FIG. 1, the boom unit 1 may be connected at one of its ends to stretching means (not shown), which may for instance, comprise a cable reeled on a winch.

This connection is effected through means for transmitting and distributing the applied load, said means comprising in the embodiment of FIG. 1, a triangular member having a plurality of parallel flanges 21a traversed by the fastening rod 11. The stretching cable may be secured at 21b to the member 21.

For an easier conveyance of the boom, before positioning thereof, the stiffening members such as 6, 7 and 12 may advantageously be foldable (hinged connection 34, FIG. 2), and including means, such as the pin 35, for holding these members in their unfolded position.

Figure 3:
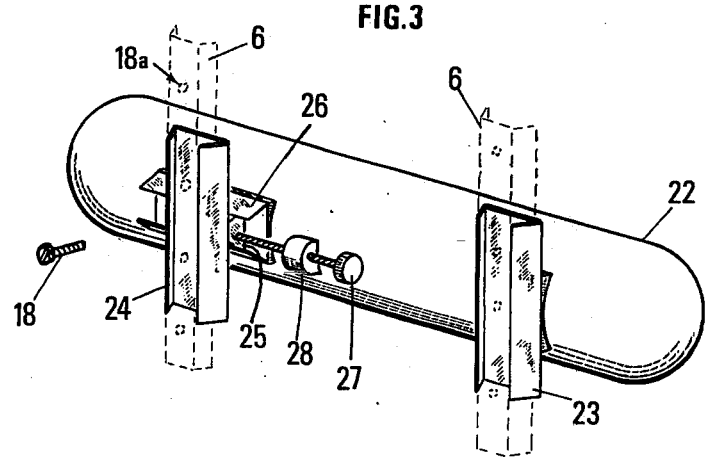
FIG. 3 shows a rigid longitudinal float slidably mounted on two stiffening elements with adjustable connection means on each of these elements.

FIG. 3 shows longitudinal floats adapted to be secured in horizontal position to two stiffeners of the armouring 3 by means of two profiled elements 23 and 24 slidable along two profiled stiffening members such as the member 6 of FIG. 1, to which these profiled elements may be secured by means of bolts 18 engaged in apertures 18a.

The element 24 is secured to a member 25 displaceable along a horizontal slide 26 secured to the float, and means are adapted to stretch the armouring 3 between the stiffening members 6 while preserving the float from the traction loads which are applied to this armouring and tend to move apart the two profiled stiffening members 6 shown in FIG. 3. In the illustrated embodiment these means comprise a screw 27 carried by a nut 28 integral with the float, the end of this screw being only in abutment against member 25 without being screwed therein.

The horizontal floats 22 as well as the vertical floats 14 may be either rigid (FIG. 3) or inflatable.

Figure 4:
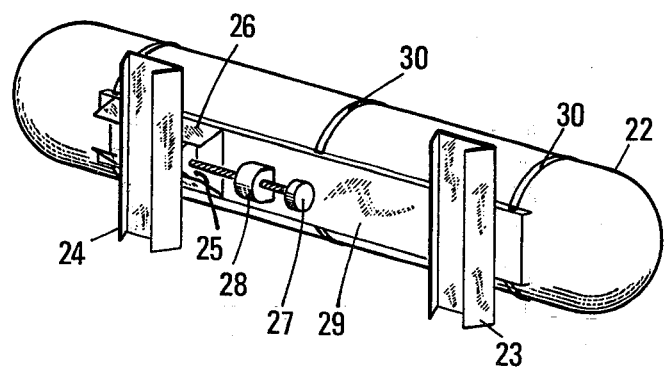
FIG. 4 illustrates another embodiment of the invention comprising an inflatable longitudinal float provided with a rigid reinforcement.

In the latter case they will comprise at least one rigid reinforcement 29 secured to the float at 30 and carrying the slidable elements 23 and 24 (FIG. 4).

Horizontal floats 22 may be positioned on both sides of the boom armouring, these floats being secured to stiffening members 6 and 7.

It is also possible to provide horizontal floats perpendicular to the plane of the armouring 3 these floats being secured to the stiffening members on one side or both sides of the armouring 3.

In the embodiment illustrated by FIGS. 5, 6 and 7, the containment function of the boom is distinct from its function of mechanical resistance and of that of buoyancy, this containment function being ensured by the provision of a vertical skirt 31 (FIGS. 5 and 6), or horizontal skirt 32 (FIG. 7) secured to the armouring 3, or these two types of skirts being optionally combined, as illustrated in FIG. 7.

Watertight or/and permeable flexible skirts may be used, depending on the kind of polluting agent to be contained.

Water-permeable skirts may be of a netted structure.

In the case of a boom for retaining chemical products, particularly hydrocarbons, it is possible as shown in FIG. 6 to make use of a water-permeable skirt forming an envelope 31a and 31b which may contain a material 33 therein for adsorbing the polluting agent.

At least one of the skirts 31 may be a hybrid skirt having a watertight flexible upper part and a water-transparent lower part so as to reduce drag effects on the boom. Such an hybrid skirt may be manufactured by subjecting to a waterproofing treatment, a water-transparent skirt made, for example, of a netted material.

The skirt may be pressed and secured together with the armouring 3 between the profiled members 6 and 7 of at least some of the boom stiffeners.

Connection of two consecutive skirt sections can be achieved by superposing their adjacent ends, and by pressing and holding them together with the armouring 3 between the two profiled members defining a boom stiffener.

In a boom according to the invention, the armouring may optionally be extended down to the water bottom and rest thereon under the action of ballast weights.

Such an embodiment may be in particular suitable for the complete closure of a water area (i.e., for use in aquaculture).

Similarly, the boom may comprise a vertical skirt secured to its armouring, this skirt extending down to the water bottom and laying flat thereon under the action of ballast weights.

Figure 8:
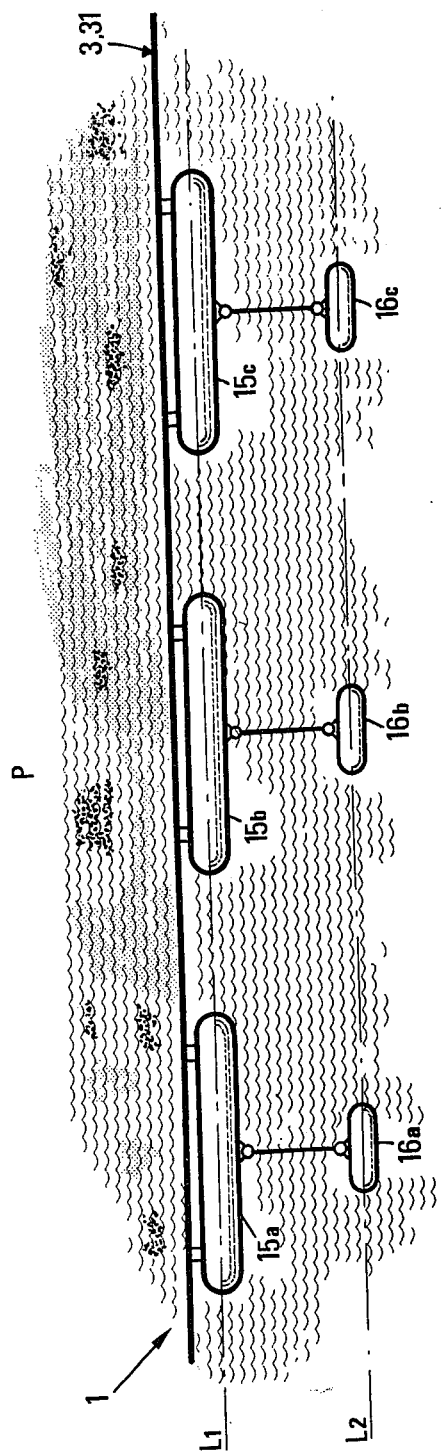
FIG. 8 is a diagrammatical top plan view of an advantageous embodiment of the boom according to the invention.

FIG. 8 is a diagrammatical top plan view of a particularly advantageous embodiment of a boom according to the invention, designated as a whole by reference 1, and made up of the assembly of a vertical barrier and of horizontal floats connected to this barrier. In the embodiment illustrated by FIGS. 8 and 9, the barrier comprises a vertical skirt 31 for retaining the polluting products P such as hydrocarbons spread over the water surface, this skirt being supported by an armouring 3 for withstanding the mechanical loads.

The floats 15a, 16a, 15b, 16b, 15c, 16c, ... etc which are substantially parallel to the barrier, are located on the same side of the armouring 3. These floats are arranged so as to form on one and the same side of the barrier, two distinct lines of floats $L_1$ and $L_2$ substantially parallel to this barrier and located at different distances therefrom.

With such an arrangement, the barrier is maintained vertical due to the reactive torque or/and a bearing reaction resulting from the presence of two distinct lines of floats. A first advantage of this type of boom is thus to reduce the importance of the means for ballasting the barrier, and such means may optionally be omitted, thereby facilitating handling operations performed on the barrier.

In the case where the floats are located on the side of the boom opposite to that in contact with the polluting products, another advantage is that this side of the boom in contact with the spills can be made completely clear of any hindrance created by the floats, thereby permitting full efficiency in the recovery of these spills as a result of the easy access thus offered to the recovery means along the boom. Moreover, in such an embodiment where the floats are exclusively located outside the polluting layer, these floats and the securing means thereof remain clean, which reduces the maintenance and cleaning requirements of the boom.

Furthermore, since the floats are located on only one side of the barrier, the latter capsizes, or falls over, on the same side over its whole length, when the water level sinks (tide). This provides in particular, a reduction of the torsional stresses applied to the barrier when the boom lies on the water bottom. When the water level progressively rises again the barrier returns to its vertical position.

Additionally, the fact that the floats and the connecting means to the barrier are located on one and the same side of the barrier, facilitates the handling and operation of the boom either from a wharf or from a stationary or movable support.

The floats 15a, 15b, 15c, etc are arranged along line $L_1$ located in the vicinity of the barrier, and the floats 16a, 16b, 16c are disposed along line $L_2$ which is more remote from the barrier.

The spacing of the float line $L_2$ from the barrier will be selected in accordance with the size of the floats 16a, 16b ... and the magnitude of the reactive torque and of the bearing reaction which are selected for the boom in operation, so as to obtain a correct vertical positioning of the barrier, taking into account the forces applied thereto (action of the wind on the emerged surface part, and of the water currents on the submerged part).

Figure 9:
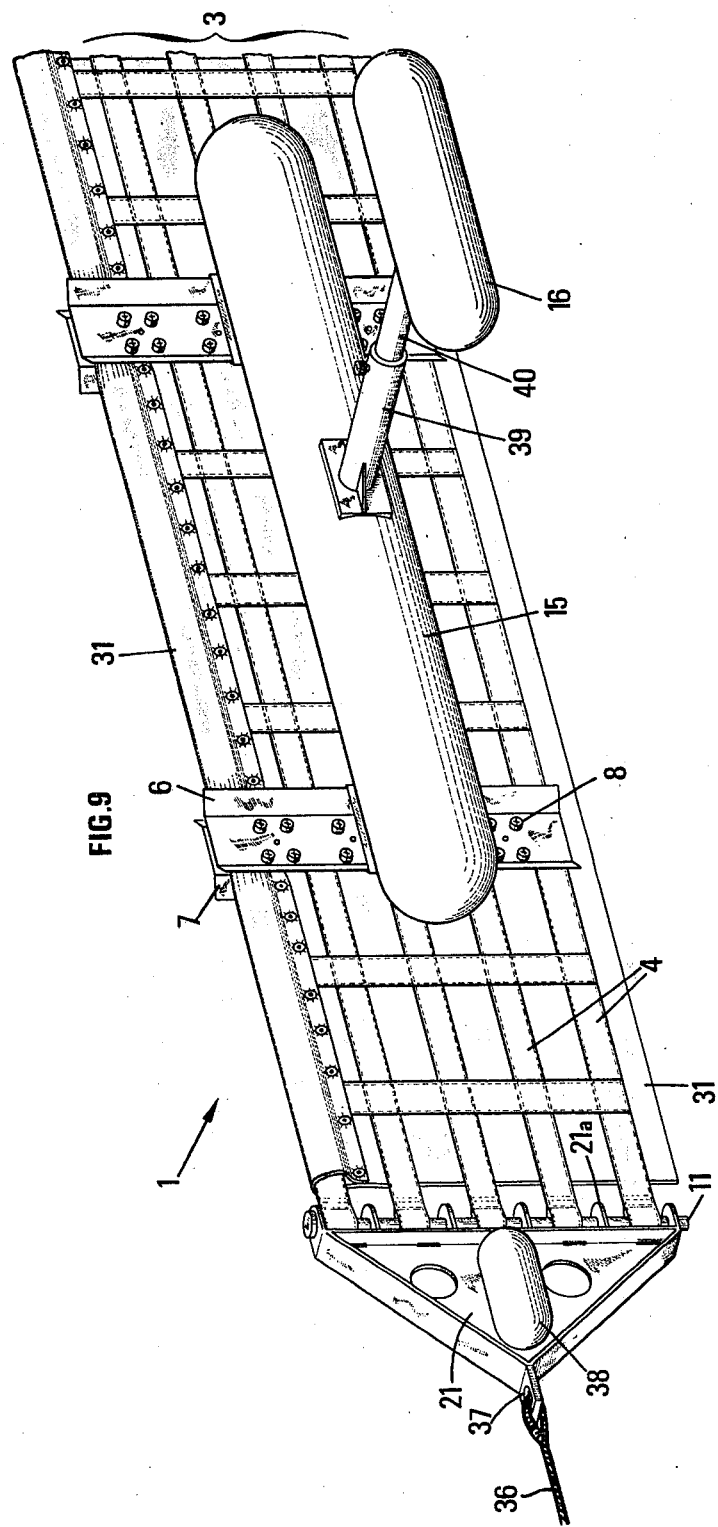
FIG. 9 is a perspective detailed view of the boom of FIG. 8, FIGS. 10 and 11 are respectively a perspective and a side view of two floats with adjustable spacing and means for securing it to the armouring.

In the embodiment illustrated in FIG. 9, the armouring 3 comprises longitudinal bands 4 highly resistant to traction, which may advantageously be made of strips of reinforced plastic material, and resistant transverse elements, which maintain a predetermined spacing between the longitudinal elements and may consist of strips 5 having the same structure as the longitudinal bands 4.

The illustrated boom unit 1 also comprises stiffeners each of which is made of two rigid stiffening elements 6 and 7, at least one of which may advantageously have a profiled cross-section. These elements are located on both sides of the assembly constituted by the armouring 3 and the skirt 31 which is pressed therebetween. They are interconnected by means of bolts or rivets, or by any other suitable clamping means.

As shown in FIG. 9, the boom unit 1 is provided at one end with a fastening system which ensures a regular distribution of the traction loads over the longitudinal elements or bands 4.

This system comprises a vertical fastening rod 11 to which are secured the ends of the different horizontal bands 4.

This fastening rod 11 is secured to a triangular metal member 21 which includes a plurality of flanges 21a traversed by the rod 11. A tensioning cable 36 is connected at 37 to the triangular member 21 which is optionally provided with a horizontal float 38.

If the boom is made up of a single boom unit, the other end of this boom unit may be secured to a metal triangular member similar to the member 21 shown in FIG. 9.

Alternatively, the boom may be constituted by a plurality of boom units such as the unit 1, which are interconnected by coupling means adapted to transmit forces from the armouring of a boom unit to that of the next one, the terminal boom unit also comprising at their ends members such as 21 connected to traction cables.

Such coupling means may include stiffening elements 12 provided with flanges 13 interconnecting vertical rods such as rods 9 and 10 shown in FIG. 1, to which are secured the end of the bands 4 of each boom unit. The skirt 31 which presents no discontinuity at the location of these coupling means will then be protected against the traction loads which are transmitted through the armourings of the two adjacent boom units 1 and 2.

Figure 10:
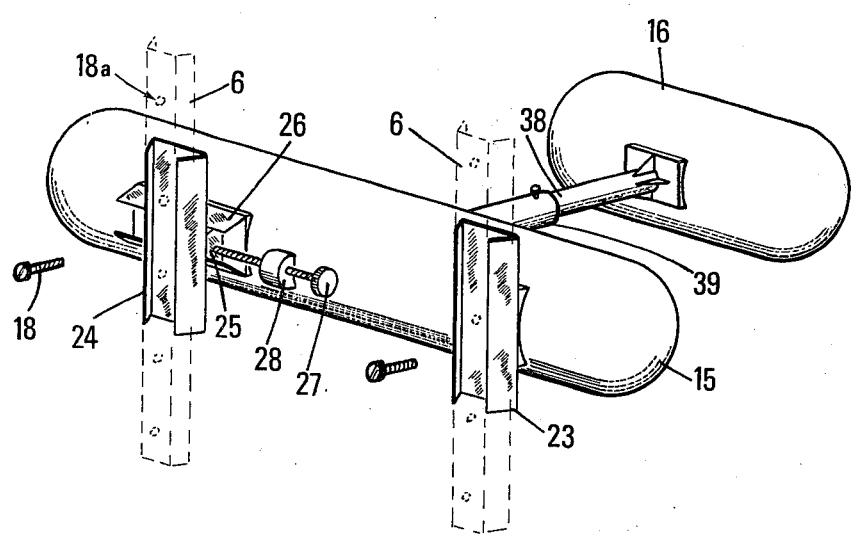
Figure 11:
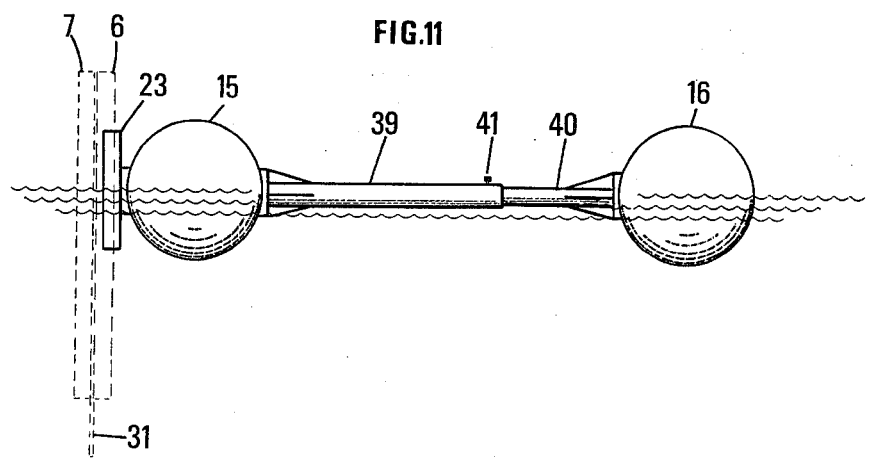

FIGS. 9, 10 and 11 illustrate a group of floats comprising a main float 15 located on the line $L_1$ formed by the floats 15a, 15b . . . , and an additional float 16 of smaller volume than the float 15 and located on the line $L_2$ formed by the floats 16a, 16b . . . . This group of floats 15–16 is detachably connected to the barrier. To this end, the float 15 comprises, as in the embodiment illustrated in FIG. 10 and two elements 23, 24 slidably mounted along the two profiled stiffening elements such as the element 6 shown in FIG. 9.

One of these slidable elements, e.g. the element 24, is secured to a member 25 movable along a horizontal slide 26 fixed to the float 15. Means, which may comprise a screw 27 carried by a nut 28 integral with the float (the end of this screw bears against the member but is not screwed therein), makes it possible to stretch the armouring 3 between two profiled elements 6, by moving the elements 23 and 24 away from each other by rotation of the screw 27, while isolating the floats from the traction forces which are applied to this armouring and tend to move apart the two profiled elements 6 shown in FIG. 10.

The float 15 may be secured to the barrier at an adjustable level thereof by means of bolts 18, the stiffening element 6 being provided with a plurality of openings for each bolt 18, at various levels.

The height of the barrier above the water level can thus be fixed in accordance with the specific requirements.

The float 16 is connected to the float 15 by means comprising two slidably interconnected rods 39 and 40 making up a telescopic assembly permitting adjustment of the spacing between the float 16 and the float 15 located in the vicinity of the barrier. A screw 41 permits locking of the float 16 at the desired distance from the barrier by securing one rod with respect to the other.

In an advantageous embodiment of the invention illustrated in FIGS. 12 to 15, the floats such as 15 and 16 of a same group of floats are interconnected by a rod 42 provided with articulations 43 and 44 (an adjustable telescopic assembly 39, 40, 41 may be used instead of the rod 42, as illustrated by FIGS. 10 and 11).

This hinged assembly has at least two positions comprising a transport position illustrated by FIG. 12, wherein the floats are substantially aligned.

These floats may be placed at right angles to the rod by pivoting about the articulation 43 (FIG. 13) and the articulation 44 until they reach the operative position shown in FIG. 14. They may be locked in this position by any suitable means comprising, for example, pins.

FIG. 15 shows a group of three floats, including a main float 45, which is a member of the float line $L_1$ and can be connected to a stiffening element 6 in a similar manner as the float 15 of the above-described embodiment. This float 45 is connected to two additional floats 46 and 47 by two rods 48 and 49 comprising respectively, the articulations 50 and 51, 52 and 53, whereby the floats can be given a position of transport (FIG. 15) as in the above-illustrated embodiment. An adjustable telescopic assembly, such as the assembly 39, 40 and 41 shown in FIGS. 10 and 11 may be used instead of the two rods 48 and 49.

In the various embodiments of the invention, the floats may be either rigid or of the inflatable type provided with rigid reinforcements which permits in particular, connecting the floats to each other and to the barrier.

It will be possible without departing from the scope of the invention to add to the above-defined lines of floats $L_1$ and $L_2$, floats of different orientation, such as for example, floats perpendicularly secured to the barrier on the same side as the float lines $L_1$ and $L_2$ which run parallel to the barrier.

FIGS. 16 to 21 show an embodiment of the invention which can be easily and rapidly put into operation and comprises means for permitting a quick connection and disconnection of the floats and the barrier, as well as of successive barrier units, these means being associated to means for separate storage of the barrier and of the floats.

FIG. 16 shows two successive units 1 and 2 of a boom according to the invention, each of which is formed by the association of a flexible vertical barrier with horizontal floats connected to this barrier. This barrier may comprise a skirt 31 adapted to retain polluting products, such as hydrocarbons, spread over the water surface. This skirt is supported by an armouring 3 for withstanding the mechanical loads.

As above-indicated, this armouring 3 comprises longitudinal elements 4 highly resistant to traction, which may be advantageously constituted by bands of reinforced plastic material, and resistant transverse elements which maintain a predetermined spacing between the longitudinal elements 4 and may be formed by strips 5 having the same structure as longitudinal bands 4. The ends of these vertical strips 5 form loops wherethrough are inserted cables 54 and 55 respectively. These cables may support the above-mentioned skirt 31, optionally a net, as well as buoyancy means (secured to the upper cable) and ballast weights (secured to the lower cable).

The successive boom units 1 and 2 also comprise vertical stiffeners each of which is formed by profiled rigid elements 6 and 7. These stiffening elements are located on both sides of the assembly constituted by the armouring 3 and the skirt 31 pressed therebetween. They are interconnected by bolts or rivets 8, or any other suitable clamping means.

These stiffeners are provided with ballast weights 6a at their lower part.

Such a structure avoids the transmission of the traction forces supported by the resistant bands 4 to the floats 15 and 16 which are connected to the stiffening elements by means of a fast connection and stretching of the armouring 3, as described below.

In the embodiment illustrated in FIG. 16, the boom also comprises two types of horizontal floats designated by references 15 and 16, which are located on the same side of the armouring 3. The floats 15 are secured to the profiled stiffening elements 6, and the floats 16 are connected to the floats 15 by coupling means comprising hollow connecting rods 56, and are located at a distance from the armouring 3.

The floats 15 and 16 shown in FIG. 16 are formed of parallel piped elements of sheet iron containing a plastic foam with closed pores imparting to the floats of good stiffeness, this sheet iron being held by clamping collars 98 and 99 (whose tightening bolts are not shown in FIG. 16).

The terminal clamping collars of the floats 15 are advantageously provided with handles facilitating the handling of the floats.

The boom units 1 and 2 comprise coupling means providing for a good transmission of the traction loads between these boom units and a uniform distribution of these loads over the different horizontal bands 4.

This coupling system (FIG. 17) comprises vertical rods 9 and 10 to which are secured the ends of the different horizontal bands 4. The rods 9 and 10 are carried respectively by metal members 57 and 58, provided with a plurality of flanges 13 traversed by the rods 9 and 10.

A system for a rapid connection of the boom units 1 and 2 is made up by the combination of two hollow profiled elements 57a and 58a which are respectively integral with the members 57 and 58 and can be assembled by a connecting key 59 of a shape complementary to that of the two profiled elements 57a and 58a and interconnecting them when inserted into these elements.

Abutments means (not shown) at the lower part of the profiled elements 57a and 58a prevent the key 59 from escaping by sliding downwardly when the armouring 3 is vertical and free of tensile stress.

A ring 59a provided at the upper part of the key 59 permits fast disengagement of the latter for disconnecting the boom units 1 and 2.

FIG. 18 illustrates means for rapidly connecting the float 15 to the stiffeners 6. Each end of this float is provided with a profiled element 60 integral with the float and perpendicular to the direction of elongation of this float, the element 60 being engaged on a slide 61 welded to the profiled stiffening element 6 at the level thereof which has been selected for securing this float. The profiled element 60 and the slide 61 are provided with quick locking means, such as the resilient tongue or clip 62 which is retracted due to its curved shape by the edge of the element 60 when the float 15 is displaced in the direction of the arrow in FIG. 18, this clip subsequently engaging a slot 63 of the element 60.

The tongue 63 can then no longer be released from the slot 63 except by exerting thereon a thrust perpendicular to the element 60 when it is desired to disconnect the float 15 from the stiffening element 6.

To prevent the tongue or clip 63 from being subjected to vertical loads in operation, when the armouring 3 is placed in vertical position, the profiled element 60 is closed at one of its ends, this end coming in abutment against the slide 61.

To permit a fast and easy stretching of the armouring 3 between the two profiled elements 6 to which the ends of the float 15 are secured, one of these ends, shown in more detail in FIG. 18, comprises a pair of sliding elements 65 and 66 oriented along the direction of elongation of the float 15, one of these elements, the element 66, being welded at its bottom part 66a to the profiled element 60, integral with the stiffening element 6, and the other element of said pair, i.e. the element 65, being secured to an extension or flange 64 of the float 15. To permit rapid stretching of the armouring 3 and prevent the stiffening elements 6 to be moved toward each other, a milled cam 67, provided with a lever 68, is rotatably mounted on the extension 64 of the float and traverses an aperture 69 provided through this extension so that the cam 67 can bear against the element 66 secured to the stiffener 6. The profile of cam 67 is such that a relative displacement of the two sliding elements 65 and 66 is only possible in the direction tending to move the two stiffeners to which the float 15 is secured away from each other.

A spring 70 holds the lever 68 in its locking position.

Thus, any reduction in the spacing of the stiffening elements 6 located at the ends of the float 15 is prevented by the cooperation of the milled cam 67 and of the element 66 whereon this cam bears, since such spacing reduction would require a rotation of cam 67 in the direction corresponding to the blocking thereof against the element 66.

Consequently, the armouring 3 always remains perfectly stretched between these two stretching elements. However, as in the embodiments shown in FIGS. 3, 4 and 10, these two stiffening elements 6 may be moved further away from each other under the action of the high loads exerted in operation on the armouring 3, without transmitting these loads to the float 15, since rotation of the milled cam 67 remains possible in the direction opposite to that of the blocking of the cam 67 against the element 66.

FIG. 19 illustrates means for rapidly coupling a float 15 or 16 and a hollow connecting rod 56.

The clamping collar 99 of the float 16, as well as the central collar 98 of the float 15 comprise a gutter-shaped element 71 wherein the rod 56 can be inserted slidingly in the direction of the arrow until its end reaches an abutment 72 forming a fastening finger which engages said rod end.

The rod 56 and the float can be easily locked in this position by quick locking and releasing means such as those shown in FIG. 19, which comprises in combination a stirrup 73 surrounding the gutter-shaped element 71 and carrying a cam 74 provided with a locking and releasing lever 75, cam 74 pressing the connection rod 56 against the bottom of the gutter-shaped element 71 by means of a clamping member 76.

The inner part of this gutter-shaped element is provided with a rubber pad for improving the clamping effect.

A flange 71a of the gutter-shaped element 71 prevents the stirrup 73 from escaping from this element in the clamping position.

FIG. 20 shows a mobile device for the storage of the barrier after dismounting of the assembly made up of the floats 15 and 16 and their connecting rod 56, this device permitting the rapid loading and unloading of the flexible armouring 3.

Such mobile device comprises a container 77 whose design and size are adapted for its transportation by any means on land, at sea and in the air.

This container may for example be equipped with skids or, as illustrated, with wheels 78 facilitating its displacement from the loading place of the boom to its site of utilization, by using a towing vehicle to which the container 77 is coupled.

The container 77 has two side walls 79 and 80 provided with longitudinal rails 81 and 82 for guiding rollers 83 which can be adapted to the ends of the stiffening elements 6 and 7 of the boom (FIG. 16), whereby the armouring 3 can be stored in successive folds 84 formed under the rails 81 and 82 (FIG. 20). These rollers 83 also enable the boom to roll flat on the ground, thus facilitating the displacement of this boom to the selected site.

Inclined loading and unloading ramps 85 and 86 whereon the rollers 83 can roll are adaptable to the guide rails 81 and 82 at one end of the container 77, and these ramps can be extended by at least one substantially horizontal working frame 87. The latter, which comprises a floor provided with two parallel rails with a spacing corresponding to that of the rollers 83, permits assembling and disassembling of the boom floats.

At its unloading end the container 77 advantageously comprises unloading control means, these means permitting manual or automatic control of the running speed of the rollers 83 falling from the rails 81 and 82 onto the ramps 85 and 86.

As illustrated in FIG. 21, such means may comprise distribution means or catches 88 and 89 rotatably mounted about horizontal axes, these catches being interconnected by a rod 90 which stops and holds the rollers, but can be drawn back by actuation of a lever 91 connected to the rod 90.

The container 77 can be surmounted by a chest 92 wherein the floats 15 and 16 and the connecting rods 56 of the boom can be stored, as well as the ramps 85 and 86. The side walls of the chest 92 may, for example, constitute the working frame 87.

The rails of this working frame 87 are advantageously provided with screw jacks 87a whereby these rails may be placed in a substantially horizontal position, irrespective of the ground irregularities.

As shown in FIG. 16, the metal member supporting the flanges 21a at the ends of the boom is secured to a member 93 to which a traction cable can be connected. Coupling of member 93, and of the metal member carrying the flanges 21a may advantageously be similar to the rapid coupling system shown in FIG. 17 which comprises a coupling key 59 for connecting the boom units 1 and 2.

To facilitate hauling of the boom onto the dry land (as described below), the end of the boom shown in FIG. 16 is advantageously provided with means for progressively tilting the boom as it is hauled out of water from a vertical working position in the water, to a horizontal position wherein the boom rolls flat on the ground by means of rollers 83.

This means may advantageously comprise (FIG. 16) a roller 94 connected to the boom armouring by three arms 95, 96 and 97, such that the plane of the arms 96 and 97 forms with the plane of the armature 3 an angle greater than 90°. Thus the roller 94 is located below the cable 54 when the boom is hauled out of water, and the boom is progressively laid down as it is hauled on land so as to be laid flat onto the ground where it rests on rollers 83.

OPERATION

1. Setting the boom afloat

The container 77, and the chest 92 which surmounts this container (FIG. 20), are loaded on a truck or a train and the assembly is carried to a place near the launching site selected for the boom such as a beach.

The container 77 and the chest 92 are then unloaded, either together or separately, by means of a crane.

The container 77 having wheels 78 is then hauled to the site where the boom is to be set afloat. There the boom is properly oriented and maintained in position. The contents of the chest 92 (floats 15 and 16, connecting rods 56) are then unloaded, the unloading ramps 85 and 86 (also stored in the chest 92) are connected to the rails 81 and 82 of the container 77 and the horizontal working frame 87 is mounted.

The armouring 3 is then progressively unreeled by actuating the handle 91 (FIG. 21), the floats 15 are coupled to the armouring 3 as the latter passes on the working frame 87, and the floats 16 are connected to the floats 15 by the connecting rods 56.

A pull is exerted on the boom by a traction-vehicle, the boom then rolling on the shore by means of the rollers 83 until it reaches water, the pull being then ensured by a ship.

Assembling the different boom lengths by means of double-keys 59 (FIG. 17) is achieved either on land or at sea.

As the boom is progressively submerged, it tilts under the action of the ballast weights 6a secured at the lower end of the stiffening elements 6, the connecting rods 56 then passing from their vertical position shown in FIGS. 16 and 20 to the horizontal position wherein the floats 16 are laid onto the water.

The weight 6a has a stabilizing effect for the boom subjected to wind and water currents.

2. Hauling the boom onto dry land

A pull is exerted on the boom from a ship until the boom reaches the shore where the pull applied to one end of the boom is now continued by a vehicle on land.

The boom tilts progressively as it leaves water, the connecting rods 56 of the floats pivoting to a vertical position and the rollers 83 rolling on the shore.

This tilting movement towards a vertical position is caused by the particular arrangement 94 (FIG. 16), as above indicated.

Successive boom lengths may then be disconnected onshore (this operation may however also be carried out offshore).

The connecting rods 56 for the floats, and the floats 15 and 16 are disconnected on the working frame 87 or on the ground.

The armouring 3 is folded in the container 77, either manually or by using mechanical means such as winches, pulleys . . . etc.

The floats are then properly stored in the chest 92 which is thereafter placed on the container 77.

We claim:

1. A floating boom unit having a flexible structure comprising: a plurality of floats; at least one barrier associated with said plurality of floats for being supported thereby in a substantially vertical position; said at least one barrier comprising at least one armouring adapted for allowing the passage of water therethrough, and made up of plural transverse stiffening means connected along said armouring at spaced intervals and adapted for having said floats attached thereto for providing stability to the structure, and a plurality of traction resistant flexible transverse elements and a plurality of traction resistant flexible longitudinal elements interconnected, whereby said longitudinal elements are adapted to withstand substantially all the longitudinal loads resulting from traction when the boom is in use, and said longitudinal elements extending between the upper and lower edge of the boom for having said longitudinal loads distributed between said longitudinal elements; and said interconnection between said plurality of longitudinal elements and said plurality of transverse elements maintaining said longitudinal elements substantially uniformly spaced apart from each other throughout said intervals between said transverse stiffening means for having said longitudinal loads distributed in a balanced manner throughout said longitudinal elements.

2. A floating boom unit having a flexible structure comprising: a plurality of floats; at least one barrier associated with said plurality of floats for being supported thereby in a substantially vertical position; said at least one barrier comprising at least one armouring adapted for allowing the passage of water therethrough, and made up of plural transverse stiffening means comprising transverse rigid members connected along said armouring at spaced intervals and adapted for having each one of said floats connected respectively to two spaced transverse rigid members for providing stability to the structure, said transverse stiffening means further comprising a longitudinal rigid member integral with each float extending between each of the respective two spaced transverse rigid members connected to each float, and having stretch means thereon for longitudinally stretching the portions of said armouring extending between each of said respective two spaced transverse rigid members connected to each float, and adapted for preventing each one of said respective two spaced transverse rigid members connected to each float to move toward the other, and allowing them to move away from the other when a traction load is applied to said armouring; said armouring additionally comprising a plurality of traction resistant flexible transverse elements and a plurality of traction resistant flexible longitudinal elements interconnected whereby said longitudinal elements are adapted to withstand substantially all the longitudinal loads resulting from traction when the boom is in use, and said longitudinal elements extending between the upper and lower edge of the boom with said longitudinal loads distributed between said longitudinal elements; and said interconnection between said plurality of longitudinal elements and said plurality of transverse elements maintaining said longitudinal elements substantially uniformly spaced apart from each other throughout said intervals between said transverse rigid members for having said longitudinal loads distributed in a balanced manner throughout said longitudinal element.

3. A floating boom unit according to claim 1, wherein said plurality of longitudinal and said plurality of transverse elements are a plurality of interconnected elements made of a reinforced plastic material.

4. A floating boom unit according to claim 1, wherein each one of said transverse stiffening means comprises two connected transverse rigid members located on each side of said armouring, said two transverse rigid members being profiled and pressing said longitudinal elements therebetween.

5. A floating boom unit according to claim 1, wherein each float of said plurality of floats comprises an inflatable float, each provided with at least one rigid reinforcing member extending longitudinally along each float.

6. A boom unit according to claim 2, wherein said stretch means comprises securing means for securing, in operation, to one of each of said two spaced transverse rigid members connected to each float, a pair of sliding elements oriented in the direction of elongation of the floats, one of said pair of sliding elements being integral with one of said transverse rigid members, and the other being integral with the float, and wherein said stretch means adapted for preventing said two spaced transverse rigid members from moving toward each other comprises a milled cam carried by said sliding element integral with the float, and bearing on said sliding element integral with said transverse rigid member, said cam having a profile permitting relative movement of said two sliding elements only in the direction tending to move said transverse rigid members away from each other.

7. A boom unit according to claim 1, wherein said plurality of floats are located on a single side of the armouring.

8. A boom unit according to claim 7, wherein said plurality of floats comprise groups of at least two floats spaced apart from each other and connected along said armouring, and each float of said groups of at least two floats interconnected by coupling means in a longitudinal direction relative to the boom armouring on the surface of the water.

9. A boom unit according to claim 7, wherein said plurality of floats comprise groups, each of which comprises an elongate main float longitudinally secured to the armouring, and at least one additional float having a smaller volume than said main float connected to said main float and maintained at a distance from the armouring.

10. A boom unit according to claim 7, comprising a watertight skirt secured to said armouring.

11. A floating boom unit according to claim 1, wherein each end of each of said transverse stiffening means comprises rollers for easier setting of the boom afloat and easier storage of the armouring in an elongate horizontal container adapted for having said boom unit loaded thereon, said container having one end for loading and unloading said boom, and two parallel vertical side walls provided with horizontal rails for supporting said rollers, said armouring being stored in successive folds in said container, and inclined ramps provided for loading and unloading said armouring, said ramps being adapted to be extended by at least one substantially horizontal working frame permitting connecting of the floats to the armouring and disconnection of said floats therefrom.

12. A boom unit according to claim 1, further comprising means for tilting said boom unit from a vertical working position to a horizontal position wherein the boom can roll flat on the ground, said tilting means being adapted to contact the ground when the boom is hauled out of the water.

13. A boom unit according to claim 12, wherein said tilting means comprises a roller secured at one end of the boom, spaced apart and extending away from said armouring and located below the lower level thereof when said armouring is in a vertical position, said roller arranged, when rolling on the ground, for causing a progressive tilting of the boom as soon as the water depth becomes lower than the boom height when said boom is hauled out of the water.

14. A floating boom unit according to claim 1, comprising horizontally extending floats secured to said transverse stiffeners extending longitudinally at substantially right angles to the plane of the armouring.

15. A floating boom unit according to claim 1, comprising at least one skirt attached thereto and having an upper watertight flexible part and a lower watertransparent part.

16. A floating boom unit according to claim 1, wherein a normally emerged upper part of the boom further comprises auxiliary floats for facilitating setting said boom upright in water.

17. A floating boom unit according to claim 8, wherein the floats within respective groups are interconnected by an articulated system for positioning the floats as substantially an extension of each other for transport, and a working position in which the floats are substantially parallel to each other in spaced relationship, the passage from said transport position to said working position being obtained by pivotal movement of the floats about respective axes of articulation, and said floats being held in said working position by locking means.

18. A floating boom unit according to claim 9, comprising means for adjusting the spacing of said additional floats with respect to said main floats and means for locking said additional floats in position.

19. A floating boom unit according to claim 9, wherein said main float is connected to said additional float by means of the following combination of elements:
(a) a clamping collar encircling each float, said collar comprising a gutter-shaped element adapted for having a connecting rod for the floats inserted therein, said rod having one end engaging a fastening member secured to said gutter shaped element, and
(b) means for pressing said connecting rod against the bottom of said gutter-shaped element, said pressing means including a quick locking and releasing rotatable lever.

* * * * *